No. 689,754. Patented Dec. 24, 1901.
H. A. ROWLAND.
PAGE PRINTING MACHINE.
(Application filed Dec. 29, 1899.)
(No Model.) 8 Sheets—Sheet 1.

Fig. 1.

No. 689,754. Patented Dec. 24, 1901.
H. A. ROWLAND.
PAGE PRINTING MACHINE.
(Application filed Dec. 29, 1899.)
(No Model.) 8 Sheets—Sheet 3.

Witnesses
John N. Holt
Stephen Hinsta

Inventor
H. A. Rowland.
by Wilkinson & Fisher
Attorneys.

No. 689,754. Patented Dec. 24, 1901.
H. A. ROWLAND.
PAGE PRINTING MACHINE.
(Application filed Dec. 29, 1899.)
(No Model.) 8 Sheets—Sheet 5.

No. 689,754. Patented Dec. 24, 1901.
H. A. ROWLAND.
PAGE PRINTING MACHINE.
(Application filed Dec. 29, 1899.)
(No Model.) 8 Sheets—Sheet 7.

Fig. 13.

No. 689,754. Patented Dec. 24, 1901.
H. A. ROWLAND.
PAGE PRINTING MACHINE.
(Application filed Dec. 29, 1899.)
(No Model.) 8 Sheets—Sheet 8.

UNITED STATES PATENT OFFICE.

HENRY A. ROWLAND, OF BALTIMORE, MARYLAND, ASSIGNOR TO THE ROWLAND TELEGRAPHIC COMPANY, OF BALTIMORE, MARYLAND, A CORPORATION OF NEW JERSEY.

PAGE-PRINTING MACHINE.

SPECIFICATION forming part of Letters Patent No. 689,754, dated December 24, 1901.

Application filed December 29, 1899. Serial No. 741,956. (No model.)

*To all whom it may concern:*

Be it known that I, HENRY A. ROWLAND, a citizen of the United States, residing at Baltimore city, in the State of Maryland, have invented certain new and useful Improvements in Page-Printing Machines, (Case E;) and I do hereby declare the following to be a full, clear, and exact description of the invention, such as will enable others skilled in the art to which it appertains to make and use the same.

My present invention relates to improvements in page-printers, and more particularly to an improved form of printing-machine by which telegraphic signals may be translated into typographical characters and printed in page form upon sheets of paper.

In carrying out my said invention the paper upon which the characters are printed is delivered to the printer-carriage either from a roll, in single sheets, or in any other convenient manner. The printer-carriage, actuated by suitable spacing mechanism, moves the paper step by step under a continuously-rotating type-wheel until the end of a line is reached, when by the operation of a proper lining mechanism the paper is fed up, a new line is formed, and the carriage is returned to its original position, though the carriage may be caused to reverse its motion or return to its original position at any desired point in its travel. The characters are printed by an electrically-operated platen, which is caused to strike the paper and bring it in contact with the proper character on the type-wheel for each combination of signals received. In order to accomplish this, as well as to actuate the spacer, liner, and other electrical devices of the printer, I employ as a part of my present invention circuit-combining devices constituting an improvement upon somewhat similar devices shown and described in my United States patent application for "multiplex printing-telegraphs," filed July 26, 1897, Serial No. 646,017.

Owing to the weight of the printer-carriages and paper-carrying devices hitherto used in printers of this general character some difficulty has been encountered in getting these devices to move fast enough, being usually slow in starting. According to my invention this difficulty is practically obviated by making the carriage and other traveling parts extremely simple and light, as will hereinafter appear.

Another important feature of the construction of the printer-carriage and paper-guiding devices attached thereto is their capacity to hold the paper straight during the process of printing and to insure thereby a good alinement of the printed characters.

My invention, moreover, embodies many other novel features and combinations of parts hereinafter more particularly described and claimed, and in order that the same may be more clearly understood I will describe my invention with reference to the accompanying drawings, in which the same parts are indicated by the same letters and numerals throughout the several views.

Figure 2:
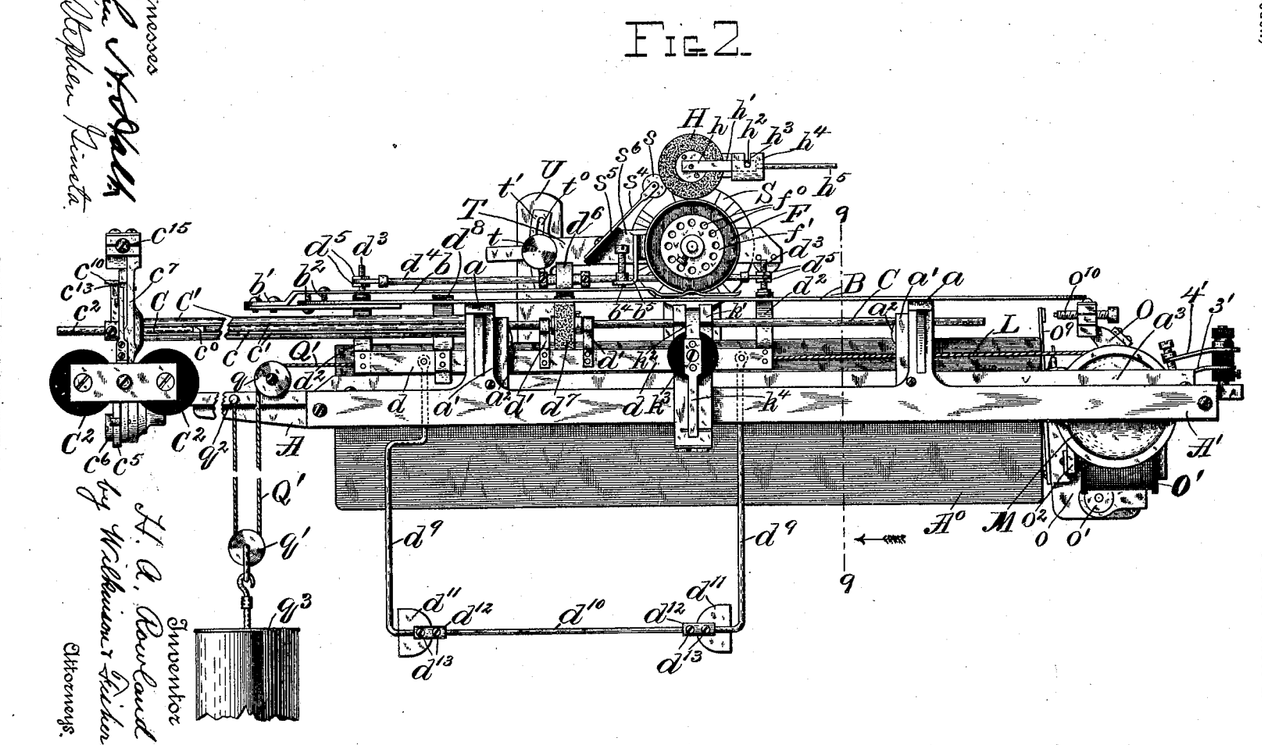
Fig. 2 is a similar view of the same apparatus with the paper detached.
Figure 3:
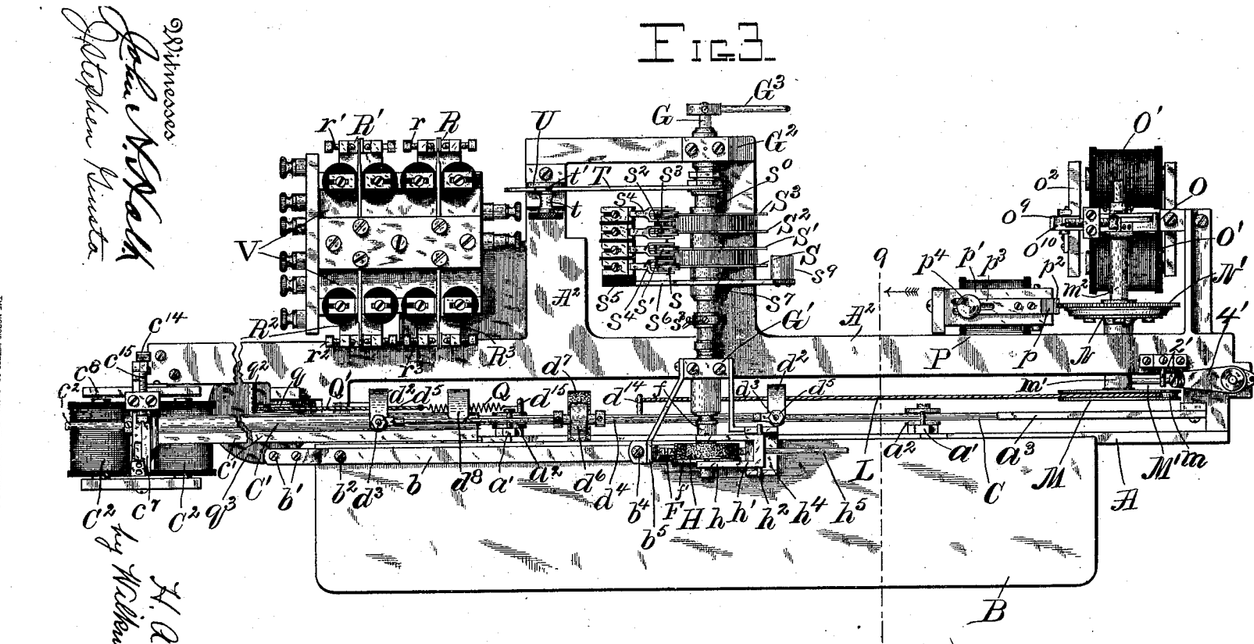
Fig. 3 is a top plan view of the printer shown in the preceding views having the paper removed, but showing the printer-relays in position.
Figures 4, 5, 6, 7:
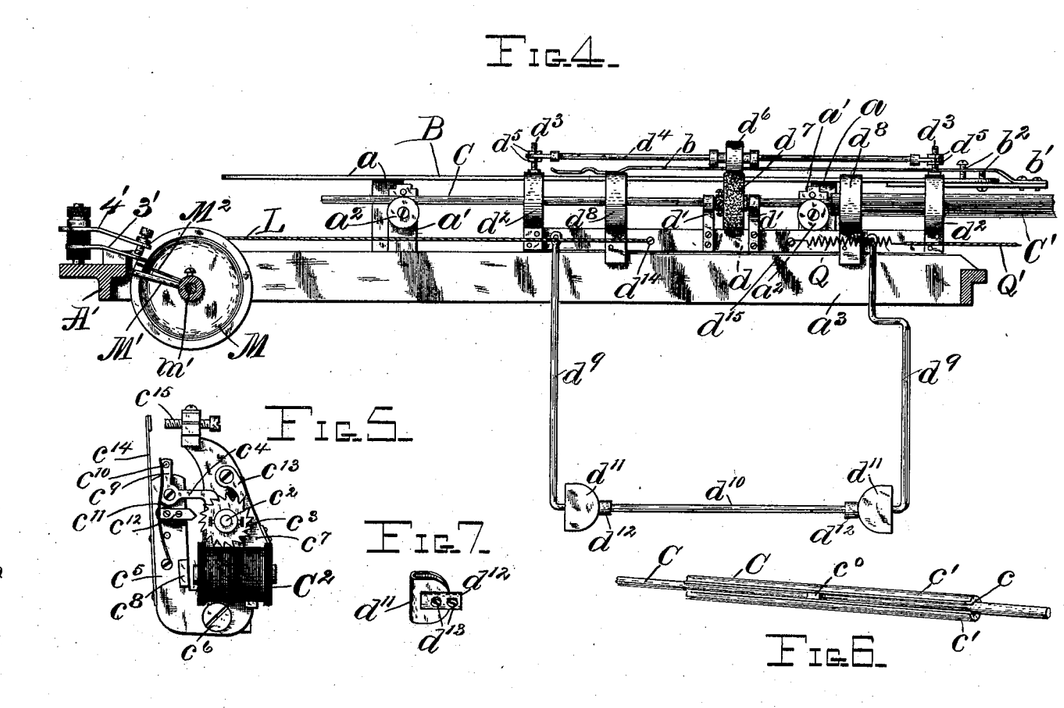
Fig. 4 represents in rear elevation and partly in section the printer frame and carriage with portions of the printer not directly connected to the carriage omitted.
Fig. 5 represents the line-actuating device in side elevation.
Fig. 6 is a fragmentary perspective view of the rod which carries the carriage, showing the flanged sleeve inclosing the same.
Fig. 7 is a perspective view of one of the adjustable paper-guides.

A illustrates the frame of the printer, having a front portion A′ and rear portion A², the former being shown as detachably secured to the latter, but may be cast integral therewith if found more convenient. The front portion A′ is provided with the upwardly-extending brackets $a$, to the upper faces of which is secured the plate B. Just in the rear of the brackets $a$ are the uprights $a'$, which are secured to the front portion of the frame of the machine and carry the rollers $a^2$. (Shown most clearly in Figs. 2, 3, and 4.) Each of the rollers $a^2$ has an annular groove around its periphery, in which rests the rod C, which carries the printer-carriage D. This carriage consists, among other parts, of a light metal bar $d$, preferably of aluminium, and near the center of this bar are two vertical hangers $d'$, engaging at their upper ends the rod C. At or near each end of the bar $d$ are secured the curved uprights $d^2$, carrying at their upper ends the screw-threaded studs $d^3$. Secured to each of these studs $d^3$ is a rod $d^4$, the ends of which are held between the nuts $d^5$ on said studs. About midway between the ends of this rod $d^4$ is a roller $d^6$, mounted fast thereon and adapted to engage a roughened roller $d^7$, mounted fast on the shaft C and between the hangers $d'$. Curved uprights $d^8$ are secured to said carriage-bar $d$ and extend below the same, engaging the guide-bar $a^3$ and preventing the carriage from slipping out of its course, the upwardly-extending curved portions acting as guides or deflectors for the paper.

The paper E, upon which the characters are printed, is carried by the carriage in the following manner: The carriage is provided with a guide-frame consisting of two depending rods $d^9$, secured at their upper ends to the carriage-bar $d$ and having their lower ends joined by the horizontal member $d^{10}$, which latter is provided with two adjustable paper-guides $d^{11}$. The edges of the paper pass through the guides $d^{11}$, while the center of the sheet is held between the rollers $d^6$ and $d^7$. The paper-guides $d^{11}$ consist each of a metal plate bent back upon itself, forming two lips between which the paper is held, as shown most clearly in Fig. 7, and provided with the lugs $d^{12}$, which engage the lower member $d^{10}$ of the guide-frame and are held fast thereto by the set-screws $d^{13}$. It has been found that by thus supporting the sheet at a central point, as between the rollers $d^6$ and $d^7$, and providing the side guides $d^{11}$ below a much more perfect alinement of the printed characters may be had than by the ordinary way of employing two cylinders that extend across the sheet or employing two sets of rollers at the edges of the paper. The paper thus held upon the carriage passes beneath the type-wheel F, which is mounted upon the shaft G, journaled in the uprights G′ G². The shaft G is driven at a constant speed and regulated, preferably, by the synchronizing mechanism described in my Patent No. 622,636, granted April 4, 1899, or such as is described either in my patent application, Serial No. 646,017, filed July 26, 1897, or in my patent application, Serial No. 706,729, filed February 24, 1899, all improvements in "multiplex telegraph systems." The shaft G may be connected to the driving power in any suitable manner, a very good way being to have an arm G³, secured fast to the shaft G, which may be engaged by an arm or lug on a driving-shaft. (Not shown.)

Figure 1:
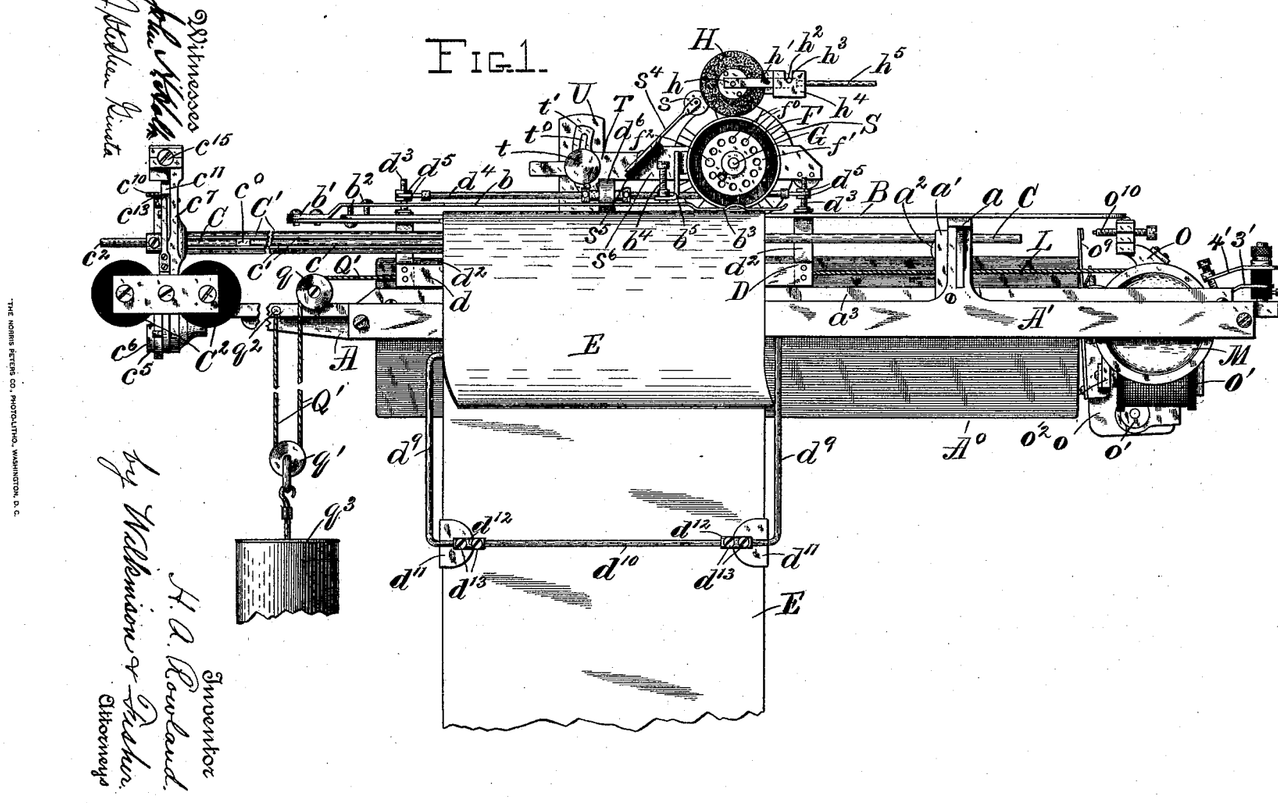
Figure 1 represents in front elevation the printer embodying my invention, showing the same with the paper in position.
Figures 8, 9, 10, 11:
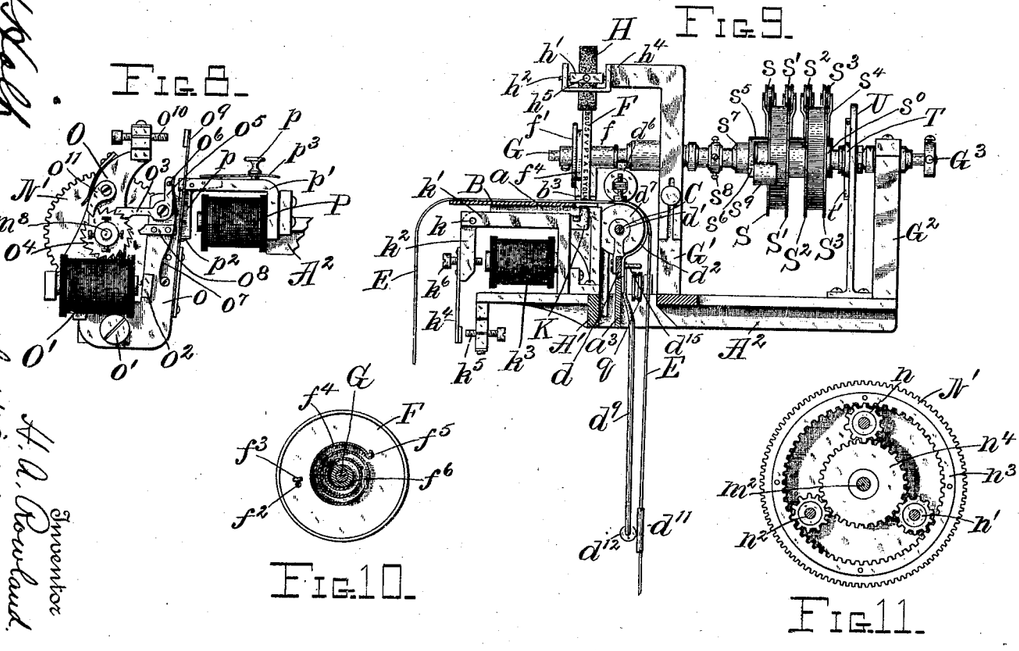
Fig. 8 represents the spacing and carriage-return magnetic device in side elevation.
Fig. 9 represents a section taken along the line 9 9, Fig. 2, and looking in the direction of the arrow, with some of the parts omitted for the sake of clearness in the drawing.
Fig. 10 is a vertical section taken through the spring of the type-wheel and showing the latter in side elevation.
Fig. 11 is a detail view, in front elevation, of the releasing-gearing employed to return the carriage to its initial position, the same being shown with its cover-plate removed.

In order to prevent blurring of the characters, as well as to prevent the speed of the shaft G from being disturbed by the blows of the platen, the type-wheel provided with the sleeve $f$ is loosely mounted upon the shaft G and driven from a disk $f'$, mounted fast on the said shaft near the type-wheel. This disk is provided with a plurality of apertures $f^0$, through one of which passes a screw $f^2$ and engages a lug $f^3$ on the type-wheel. (See Figs. 1, 9, and 10.) A coil-spring $f^4$ is secured at its outer end to the type-wheel as at $f^5$ and at its inner end to a lug $f^6$, fast on the shaft G, so that when the type-wheel is struck by the platen it may momentarily pause in order to allow a clear impression of the type to be made upon the paper, when it is quickly brought up to its proper position by the said spring. The tension of this spring is varied by placing the screw $f^2$ in the different holes $f^0$.

H indicates an ink-roller resting upon the periphery of the type-wheel and rotatably mounted in the arms $h$ of the fork $h'$. The fork $h'$ is provided with lugs $h^2$, which are carried in the vertical slots $h^3$ of the supporting-bracket $h^4$, secured to the upright G′, and is also provided with a rearwardly-extending rod or handle $h^5$, by which, together with the ink-roller, it may be lifted from the bracket when desired. In order to prevent the paper in proximity to the type-wheel from being deranged or flying up, a spring retaining-strip $b$ is secured, as at $b'$, to the plate B and provided with adjusting-screws $b^2$. The strip $b$ is bifurcated, as at $b^3$, the bifurcation passing on each side of the type-wheel, as shown. The tension of this part of the strip against the paper is regulated by the screw $b^4$, carried in a bracket $b^5$, secured to the upright G′.

K indicates the platen pivotally supported, as at $k$, in a frame $k'$, which latter is secured to the front frame portion A′. (See Fig. 9.) The platen is provided with the depending metallic arm $k^2$, which is located near the pole of an electromagnet $k^3$, secured to the frame $k'$. This depending arm $k^2$ is provided with the contact-spring $k^4$, which when the magnet $k^3$ attracts the arm $k^2$ will make contact with the contact-screw $k^5$, which completes an electric circuit, hereinafter described, the screw $k^5$ being insulated from the frame of the machine. The throw of the arm $k^2$ is limited by the screw $k^6$. It will thus be seen that the action of the printer-magnet $k^3$ is twofold. At each time that it is excited it attracts the arm $k^2$ and causes the platen to strike the paper and print a character and at the same time completes an electric circuit through the contact $k^5$. By closing this circuit at $k^5$ several things are accomplished. It actuates a relay that breaks the circuit through the printer-magnet and causes the platen to return to its initial position, while at the same time actuating other relay-magnets which cause the paper to space up and the tongue of the carriage-returning relay or "back" relay to be carried back, all of which will be fully described hereinafter in the description of the operation of the machine.

Motion is imparted to the carriage D, by which the paper is caused to travel beneath the type-wheel in a transverse direction, in the following way: A cord or chain L is secured at one end to a pin $d^{14}$ on the carriage and at its other end to the periphery of a wheel M, the periphery of the said wheel being provided with the annular groove $m$, into which the cord or chain L passes. This wheel M is mounted fast on a shaft journaled in the sleeve $m'$, which latter is mounted in the frame A', as shown. Mounted fast on the same shaft with the wheel M is a disk N, which carries the three small gear-wheels $n$, $n'$, and $n^2$. (See Figs. 3 and 11.) Just behind the gear-wheels $n$, $n'$, and $n^2$ is a disk N', which is loosely mounted on the shaft $m^2$ and provided with teeth around its periphery, as shown. Secured to the face of this disk N' is an interiorly-toothed ring $n^3$, the teeth of which mesh with the gear-wheels $n$, $n'$, and $n^2$. A central gear-wheel $n^4$ also meshes with the gears $n$, $n'$, and $n^2$ and is mounted fast on the shaft $m^2$. This arrangement constitutes what is known in mechanics as gearing having two degrees of freedom, or that property of the gearing which enables the rotary motion of the shaft $m^2$ to be transmitted to the wheel M through the gears $n$, $n'$, $n^2$, $n^3$, and $n^4$, while the gear N' is held stationary, or through the gears N', $n$, $n'$, $n^2$, and $n^3$, while the gear $n^4$ is held stationary. In other words, rotary motion may be imparted to the wheel M either by holding the gear N' stationary and rotating the gear $n^4$ or by holding the latter and rotating the gear N'. The planetary arrangement of gears by which this is effected, as herein shown, is but one of many ways of accomplishing the same result. The other end of the shaft $m^2$ passes through an upright O, secured to the rear portion of the frame of the machine. This upright carries two electromagnets O' and an upwardly-extending rocking arm $o$, pivoted as at $o'$. (See Fig. 8.) This rocking arm is provided with an armature $o^2$ and a pawl $o^3$, which latter engages the teeth of a ratchet $o^4$, mounted fast on the end $m^3$ of the shaft $m^2$. The pawl $o^3$ is provided with an upwardly-extending arm $o^5$, having a lug $o^6$, against which presses a spring $o^7$, holding the said pawl in engagement with the ratchet. The rocking arm $o$ also carries an auxiliary stationary pawl $o^8$ and a spring contact-maker $o^9$, which latter is adapted to make contact with the contact-screw $o^{10}$ when the magnets O' attract the armature $o^2$. (See Fig. 8.) The contact-screw $o^{10}$ is insulated from the frame of the machine, the latter being the negative pole of the electric circuit, as will hereinafter more fully appear. The pawl $o^{11}$ prevents any backward motion of the ratchet when the pawl which imparts the positive forward motion is released. P indicates an electromagnet secured to the frame of the machine, as shown, and provided with a depending swinging armature $p$, pivoted in the frame $p'$. The lower end of this armature $p$ is provided with a lip $p^2$, which is normally held in engagement with the teeth of the wheel or disk N' by the spring $p^3$, the tension of which is regulated by the adjusting-screw $p^4$. The action of this mechanism for imparting transverse movement to the carriage is as follows: Immediately after a letter has been printed the magnets O' become energized and attract the armature $o^2$. This causes the rocking arm $o$ to move forward, and this in turn causes the pawl $o^3$ to rotate the ratchet $o^4$ a certain distance. The ratchet being fast on the shaft $m^2$ causes it to rotate to the same extent, and as this shaft carries the central gear-wheel $n^4$ the latter will transmit its motion through the gear-wheels $n$, $n'$, and $n^2$ to the disk N and from thence to the shaft carrying the wheel M. This wheel M is thus caused to rotate a certain distance, which obviously will cause the carriage to travel a corresponding distance, being connected thereto by the cord or chain L. The distance which the carriage is thus caused to travel is usually that of a space. The step-by-step movement of the carriage may be kept up until it is desired to return it or allow it to travel back in the opposite direction, as when the end of a line is reached. This is partly accomplished by energizing the magnet P, which is caused thereby to attract its armature and withdraw the lip $p^2$ from engagement with the toothed disk N'. When the disk N' is thus disengaged, the shaft carrying the wheel M is free to rotate backward by having the gears $n$, $n'$, and $n^2$ mesh with the toothed ring $n^3$; but this does not impart a reverse motion to the carriage. It only releases it. The actual reverse motion is imparted to the carriage by a falling weight. A spring Q is attached to a lug or pin $d^{15}$ on the carriage, and to this spring is attached a cord Q', which passes over a roller $q$ and thence around a pulley $q'$, being connected at its other end to the frame of the machine, as at $q^2$. The pulley $q'$ carries a weight of any desired form, which is held within an ordinary dash-pot $q^3$.

The paper is fed to the machine and new lines of characters formed by imparting rotary motion to the roughened roller $d^7$ through the shaft or rod C. In order to impart this rotary motion to the said roller and at the same time allow the rod C to move longitudinally, which latter takes place as the carriage travels, the rod C carries an elongated sleeve C', having a longitudinal slot $c$, along the edges of which extend the flanges $c'$, and as the rod C is provided with a lug $c^0$, (see Figs. 1, 2, and 6,) located between the flanges $c'$ of the sleeve C', it is obvious that when rotary motion is imparted to the sleeve it will be transmitted through the lug $c^0$ to the rod, at the same time allowing the rod to travel longitudinally. This rotary motion of the rod C or sleeve C' is a step-by-step motion imparted thereto by rigidly securing one end of the sleeve C' to a short shaft or rod $c^2$ and mounting upon this rod a ratchet $c^3$. This ratchet is actuated by a pawl $c^4$, (see Fig. 5,) which is pivoted upon a rocking arm $c^5$, which in turn is pivoted, as at $c^6$, to an upright $c^7$, secured to the frame of the machine, as shown. The rocking arm $c^5$ carries an armature $c^8$, which is located directly in front of the poles of the electromagnet $C^2$. When the magnets $C^2$ are excited, they attract the armature $c^8$, which causes the pawl $c^4$ to advance the ratchet a predetermined distance, and when the magnet becomes demagnetized the rocking arm falls back to its original position by virtue of its own weight. The pawl $c^4$ is provided with an upwardly-extending arm $c^9$, carrying a pin or lug $c^{10}$, against which rests the spring $c^{11}$, which latter holds the pawl in engagement with the ratchet-teeth. An auxiliary fixed pawl $c^{12}$ is secured to the rocking arm directly beneath the pawl $c^4$, and backward motion of the ratchet is prevented by the pawl $c^{13}$. The rocking arm $c^5$ also carries an upwardly-extending spring contact-maker $c^{14}$, which every time the magnets $C^2$ are excited makes contact with the insulated contact-screw $c^{15}$ and completes an electric circuit, hereinafter described. Thus it will be seen that at each time the magnets $C^2$ are excited the paper will be fed up a certain distance, and this distance is usually that from one line of printed characters to the next.

The printer herein described being designed to operate with my system of multiplex telegraphy is adapted to print a character for each combination of signals received. To this end my present invention embodies a device for combining the local printer-circuits in such a way that electric currents will be allowed to pass to the various electromagnetic parts of the printer at such times as to cause them to properly perform their funtions relative to the printing of a signal. The combination and distribution mechanism for accomplishing the above is mounted on the same shaft G with the type-wheel, and consists, among other parts, of four segmental rings S, S', $S^2$, and $S^3$, all insulated from each other with respect to their mounting, but electrically connected, as hereinafter described, and shown in Fig. 12. These segmental rings are rigidly secured to the sleeve $s^0$, which is loosely mounted on the shaft G, and each ring is provided, respectively, with the roller-contact makers $s$, $s'$, $s^2$, and $s^3$, which are mounted in the spring-supports $s^4$, secured to an insulating-plate $s^5$. This plate $s^5$ is secured to one end of an arm $s^6$, which is rigidly secured to a sleeve $s^7$, mounted on the shaft G and held fast thereto by the set-screws $s^8$. At the opposite end of the arm $s^6$ from the contact-makers is a counterbalance-weight $s^9$. The contact-makers $s$, $s'$, $s^2$, and $s^3$, driven by the shaft G, sweep around the rings S, S', $S^2$, and $S^3$ at a constant speed. These segmental rings are held stationary by means of the arm T, which is rigidly secured at one end to the sleeve carrying the rings and held at its other end against an upright U by thumb-screw $t$, which is adapted to pass through a slot $t^0$ in the head $t'$ of the said arm. By means of this arrangement of the arm T the angular position of the said rings may be adjusted at will. The construction and electrical connections of this combination and distribution device, as well as its operation, will be more particulary described hereinafter with reference to Figs. 12 and 13.

R, R', $R^2$, and $R^3$ represent four polarized relays, which I will designate "distributing-relays," the office of which is to close certain circuits by which the various electrical devices of the printer are operated. These relays are mounted upon a common base V, which is secured to the frame of the printer, and have their tongues magnetized by a common magnet.

$A^0$ represents a plate secured to the frame of the machine, which while forming no essential part of the machine may be used to support resistance-coils on and for other purposes.

Figure 12:
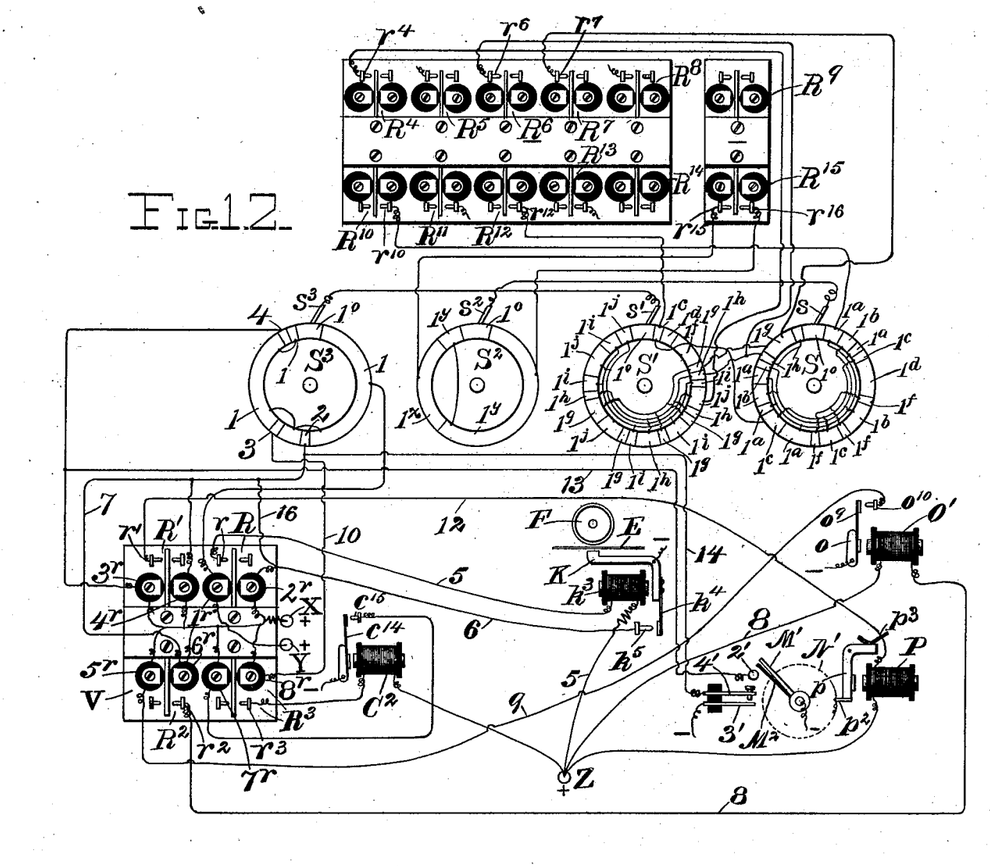
Fig. 12 is a diagram showing the various electrical connections of the printer and its actuating-relays and combination devices.
Figure 13:
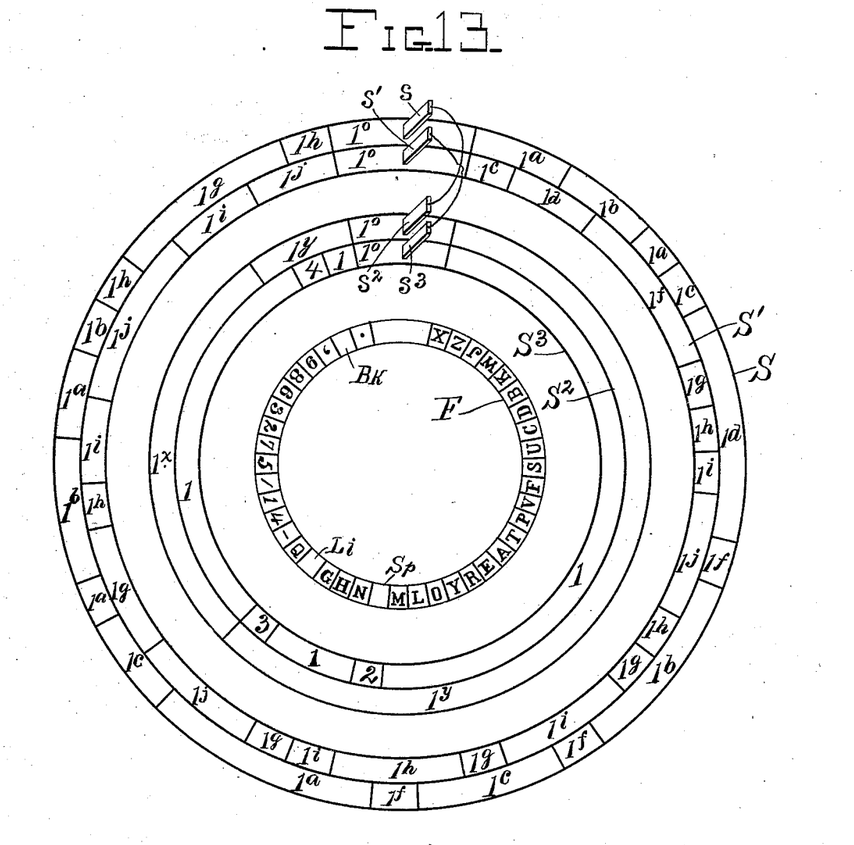
Fig. 13 is a diagram illustrating the action of the circuit-combining apparatus.

In order to describe the complete operation of the printer, which includes the method of combining the electric circuits and the distribution of the electric current, and also in order to understand the electrical connections of the various parts, reference will be had particularly to Figs. 12 and 13.

$R^4$ to $R^{15}$ represent local selecting-relays, the two $R^9$ and $R^{15}$ being mounted upon a separate base from the others. These relays are substantially similar to the selecting-relays shown and described in my patent application Serial No. 646,017, before referred to, and need not be particularly herein described. The device that I employ for combining the printer-circuits is based upon the general principle of combinations shown and described in my application last above referred to—that is to say, I employ in addition to others nine selecting-relays, which are connected to the same number of groups of segments carried by the rings S and S′; but in addition to these nine relays I employ a tenth relay, which is connected to the segments of the ring $S^2$. Thus it will be seen that in the printing of a signal according to my present invention three selecting-relays operate instead of two, as formerly, though, as will hereinafter appear, it does not necessarily require that three of the said relays be acted upon by the signaling-current for all signals.

The ring S is composed of a plurality of insulated segments $1^a$ $1^b$ $1^c$ $1^d$ $1^f$ $1^g$ $1^h$ and a blank segment $1^o$, the segments indicated by like reference characters being electrically connected to each other. The ring S′ is also composed of a plurality of insulated segments $1^c$ $1^d$ $1^f$ $1^g$ $1^h$ $1^i$ $1^j$ and a blank segment $1^o$, all of the segments indicated by similar reference characters being electrically connected together, while the segments of the ring S are electrically connected, respectively, to those indicated by the same letters on the ring S′, only a few of the segments of the separate rings being shown connected, as this is believed to be a sufficient number to illustrate the principle of the idea without rendering the drawing difficult to understand by reason of a multiplicity of connections. Each set of the nine segments $1^a$ $1^b$ $1^c$ $1^d$ $1^f$ $1^g$ $1^h$ $1^i$ $1^j$ is connected, respectively, to one contact of each of the relays $R^4$, $R^5$, $R^6$, $R^7$, $R^8$, $R^{10}$, $R^{11}$, $R^{12}$, and $R^{13}$—that is to say, the segments $1^a$ are connected to the contact $r^{10}$ of relay $R^{10}$, segments $1^b$ to the contact $r^{11}$ of relay $R^{11}$, segments $1^c$ to contact $r^{12}$ of relay $R^{12}$, and so on.

The ring $S^2$ is composed of four segments—one segment $1^x$, two segments $1^y$, electrically connected, and a blank segment $1^o$—corresponding to the blank segments similarly located in the rings S and S′. The segment $1^x$ is connected to one contact $r^{15}$ of the relay $R^{15}$ of the same relay, as shown, while the segment $1^y$ is connected to the other contact $r^{16}$ of relay $R^{15}$. The next ring $S^3$ contains eight segments—four segments 1, electrically connected to the magnet-coil $1^r$ of the relay R, the segment 2, electrically connected to the magnet-coil $4^r$ of the relay R′, to $2^r$ of the relay R, and the coil $6^r$ of the relay $R^2$, and also to the contact 4′, the segment 3, connected to the coil $8^r$ of the relay $R^3$, and the segment 4, connected to the magnet-coil $3^r$ of the relay R′ and to the contact-strip 2′. The brush $s$ is electrically connected to the brush $s^2$ and brush $s'$ to brush $s^3$, and all sweep around together and in contact with the segments of the rings.

The distribution of the segments of the rings S, S′, $S^2$, and $S^3$ and the position that they occupy relative to the characters on the type-wheel is most clearly shown by the diagram Fig. 13. From this diagram it will be seen that for each character on the type-wheel there is a corresponding combination between the said segments—that is to say, the letter "X," for example, can be printed only when the brushes $s$, $s'$, $s^2$, and $s^3$, which move together, are all passing over the segments $1^a$, $1^c$, $1^y$, and 1, the letter "Z" when they are passing over segments $1^a$, $1^d$, $1^y$, and 1, the letter "R" when they are passing together over $1^f$, $1^i$, $1^y$, and 1, the numeral "4" when they are passing together over the segments $1^a$, $1^g$, $1^x$, and 1, and the comma, for example, when the brushes are passing together over the segments $1^g$, $1^f$, $1^y$, and 1, and so on. The three blank spaces indicated $Sp$, $Li$, and $Bk$ on the type-wheel correspond to the combinations of the segments of the rings S, S′, $S^2$, and $S^3$, that operate the spacer, liner, and back magnets, respectively. The nine segments $1^a$, $1^b$, $1^c$, $1^d$, $1^f$, $1^g$, $1^h$, $1^i$, and $1^j$ are combined among themselves in thirty-eight combinations, while with the segments of the rings $S^2$ and $S^3$ they form forty-one combinations, being a sufficient number to print all the letters of the alphabet, numerals, punctuation-marks, and to operate the liner, spacer, and back magnets, as hereinafter described. It will be seen that the segments 1 and $1^y$ combine with two segments of the rings S and S′ to print most of the letters, the segments 2, $1^y$, and two segments of the rings S and S′ combine to operate the spacer-magnet, the segments 3, $1^y$ and two segments of the rings S S′ operate the liner, the segments 1, $1^x$, and two segments of the rings S and S′ to print numerals, punctuation-marks, and a letter or two, if desired, and the segments 4, $1^y$, and two segments of the rings S and S′ to operate the carriage-reversing or back mechanism. The arrangement and grouping of these segments may be varied if other combinations are found to be better without departing from the spirit of my invention. At the instant that the electric circuits are completed between the respective combinations of segments above described by the reception of telegraphic signals the platen will be caused to strike the paper in front of the character on the type-wheel which at that instant corresponds to the combination of circuits established.

Referring again to Fig. 12, X, Y, and Z represent three + binding-posts, through which the local electric current that operates the machine enters. The current for actuating the liner-magnet $C^2$, the printer-magnet $k^3$, spacer-magnet O′, and back magnet P enters through binding-post Z, while that which actuates the relays R, R′, $R^2$, and $R^3$ enters through posts X and Y. The negative terminal of these electric circuits is the metal frame of the machine.

The operation of the printer is as follows: For each telegraphic signal that is received upon the selecting-relays $R^4$ to $R^{15}$ two relays of the group $R^4$, $R^5$, $R^6$, $R^7$, $R^8$, $R^{10}$, $R^{11}$, $R^{12}$, and $R^{13}$, which are non-adjacent with respect to the order in which they are acted upon by the receiving-current, will act, closing the electric circuit from the set of segments of the rings S S′, to which their contacts are connected. The relay $R^{15}$ is also attracted by the signaling-current, so that at the reception of each signal its tongue is either against the contact $r^{15}$ or contact $r^{16}$. It will be assumed, for example, that the signal received acts upon relays $R^{10}$, $R^{12}$, and $R^{15}$. In this event the relay $R^{10}$ will close the contact at $r^{10}$, the relay $R^{12}$ the contact at $r^{12}$, and the relay $R^{15}$ will close either the contact $r^{15}$ or $r^{16}$—we will assume $r^{16}$. At a certain instant the brushes $s$ and $s'$ will be in contact, respectively, with the segments $1^a$ and $1^c$, which are connected to the contacts $r^{10}$ and $r^{12}$ of the selecting-relays. The brush $s^2$ will rest upon the segment $1^y$ and the brush $s^3$ upon the segment 1. This operation completes an electric circuit, which, beginning at Y, may be traced as follows: The current entering at X passes through coil $1^r$ of relay R into segment 1 of ring $S^3$, then into brush $s^3$, and thence into brush $s'$, segment $1^c$, relay-contact $r^{12}$, the tongue of relay $R^{12}$, then through the frame of the selecting-relays to the tongue of relay $R^{10}$, thence into contact $r^{10}$, and from there to segment $1^a$ of ring S, thence into brush $s$, and from there to brush $s^2$ into segment $1^y$ of ring $S^2$, and thence to contact $r^{16}$ of relay $R^{15}$, and through the tongue of that relay into the frame of the machine, which is the negative terminal of the circuit. When the circuit is thus so established as to allow the current to flow through the magnet-coil $1^r$ of the relay R, its tongue will make contact with the contact $r$. This, it will be seen, completes a circuit 5 from the + pole Z, through the printer-magnet $k^3$, the tongue of the relay R, and back to the negative terminal, to which the said relay-tongue is connected. The completion of this circuit, which includes the proper resistance, will cause the printer-magnet $k^3$ to attract its armature and cause the platen K to strike the paper and print the character corresponding to the signal transmitted. At the same time that the magnet $k^3$ attracts it armature and causes a character to be printed the contact-spring $k^4$ is brought against the contact or stop $k^5$, which completes the circuit 6, which so divides, as shown, that a current flows from the + terminal X through a proper amount of resistance through the relay magnet-coil $2^r$, returning the tongue of the relay R to its back-stop, which breaks the circuit through the printer-magnet and allows the platen to return to its initial position. The current in circuit 6 passes also through the relay-coil $4^r$, bringing the tongue of the relay R' against the back-stop, and through the coil $6^r$ of relay $R^2$ bringing its tongue in contact with the stop $r^2$. When the tongue of relay $R^2$ makes contact with stop $r^2$, circuit 8 is completed through the magnet O', which attracts its armature and causes the paper to advance and space automatically after the letter is printed. When the spacer-magnet thus attracts its armature, it causes the spring $o^9$ to engage the contact $o^{10}$, which completes the circuit 9. This circuit traversing the coil $5^r$ of the relay $R^2$ causes that relay-tongue to be drawn against its back-stop, which breaks the circuit 9 through the spacer-magnet O'. The foregoing is what takes place upon the printing of each signal, assuming that the end of a line has not been reached and that it is not yet desired to reverse the motion of the carriage. While it was shown in the above explanation how the automatic spacing after the printing of each letter took place, this spacing need not necessarily be automatic, as it may be accomplished at any desired time by the reception of a signal from over the line to "space." This is done by sending a signal that will complete the circuit 7, connected to the space-segment 2 of the ring $S^3$, such signal causing the tongues of the relays $R^6$ and $R^{10}$, for example, to make contact with stops $r^6$ and $r^7$. The circuit 7 passes from the + terminal X through the magnet-coil $6^r$ of the relay $R^2$, and thence to the segment 2, which at a certain time is beneath the brush $s^3$, into which the current flows. From the brush $s^3$ the current passes to the brush $s'$, to the segment $1^h$ of ring S', and thence through two of the relays of the group $R^4$ to $R^{14}$—viz., $R^6$ and $R^{10}$—having their contacts connected to the segments $1^h$ and $1^a$ of the rings S' and S by virtue of the signal to space which has been sent over the line. The current passes then from a segment $1^a$ of ring S through the brush $s$ to brush $s^2$, and thence through segment $1^y$ and relay-contact $r^{16}$ to the frame of the relay $R^{15}$. The completion of this circuit through the magnet-coil $6^r$ of the relay $R^2$ causes that relay to close the contact at $r^2$, and thus to complete the circuit 8, which will be seen to include the coil of the spacer-magnet O'. The completion of this circuit will cause the magnet O' to attract the rocking arm $o$, which will cause the printer-carriage to move up a space. At the same time the contact-spring $o^9$ engages the contact $o^{10}$ and completes a circuit 9, which will be seen to traverse the coil $5^r$ of the relay $R^2$. Obviously the relay $R^2$ will then break the contact at $r^2$, which will break the circuit 8 through the spacer-magnet, when the rocking arm will return to its original position. If it is desired to form a new line, the operator at the transmitting-station sends a "line-signal." Assuming that this signal operates the relays $R^7$, $R^{10}$, and $R^{15}$, a circuit 10 will be established through the magnet-coil $8^r$ when the brushes $s$, $s'$, $s^2$, and $s^3$ rest, respectively, upon the segments $1^a$, $1^j$, $1^y$, and 3. This will cause the tongue of the relay $R^3$ to make contact with the contact $r^3$, and thus complete the circuit through the liner-magnet $C^2$, which will cause it to attract its rocking arm $c^5$ and advance the paper the distance of one line, as described. At the same time that the arm $c^5$ is thus attracted it completes the contact at $c^{15}$, which will establish a circuit 11 through the magnet-coil $7^r$, which causes the relay $R^3$ to break the contact at $r^3$ and deënergize the spacer-magnet $C^2$.

The operation of bringing the carriage back to the commencement of a new line or reversing its motion may be accomplished either by the operator at the transmitting-station or it may be accomplished automatically. The operation when accomplished by a signal sent by the transmitter is as follows: Assuming that the signal selected for this purpose is that one which operates selecting-relays $R^4$, $R^7$, and $R^{15}$, the contacts $r^4$ and $r^7$ of relays $R^4$ and $R^7$ are connected, respectively, to the segments $1^j$ and $1^g$ of the rings S and S', and the brushes $s$ and $s'$ come in contact with segments $1^g$ and $1^j$ at the same time that the brushes $s^2$ and $s^3$ come in contact, respectively, with the segments $1^y$ and 4. This will complete an electric circuit in which the current begins from the terminal X, traverses the coil $3^r$ of the relay R', the segments $1^g$, $1^j$, and $1^y$, and 4, the brushes $s$, $s'$, $s^2$, and $s^3$, the tongues of the relays $R^4$ and $R^7$, and back through contact $r^{16}$ of relay $R^{15}$ to the negative frame. When the circuit is thus completed through the magnet-coil $3^r$, the relay R' closes the contact at $r'$, and this completes the circuit 12 through the magnet P, which causes that magnet to attract its armature $p$ and release the toothed wheel N', which, as hereinbefore described, allows the printer-carriage to return to the beginning of a new line. The automatic return of the carriage, as well as the automatic spacing up thereof at each return, is accomplished as follows: The return relay-magnet coil $3^r$ besides being connected to the back segment 4 is also connected to a contact-stud 2', and the magnet-coil $6^r$ is connected to a contact-strip 4', mounted on a binding-post with and insulated from a second strip 3'. At each advance in the travel of the printer-carriage the arm M' rotates a corresponding distance, being affixed to the sleeve of the wheel $m$, (see Fig. 4,) so that when the carriage reaches the end of its travel, which is usually the end of a line, the arm M' will make contact with the strip 2', which will complete the circuit 13 through the magnet-coil $3^r$ of the relay R', which completes the circuit 12 through the back magnet P and causes it to release the wheel N', as described. When the wheel N' is thus released, together with the arm M', it will rotate in a reverse direction, owing to the backward travel of the carriage, and by the time the carriage has traveled its full extent the arm M' strikes the contact-strip 3', connected to the negative terminal of the circuit, and brings it into contact with the strip 4', which is connected to the circuit 14 of the spacer-actuating relay-magnet coil $6^r$. This completes the circuit through the magnet O', which causes the carriage to move forward the distance of a space at each time that it is returned after the completion of a line. $M^2$ represents a spring to reduce the shock caused by the arm M' striking the lug 2'. If by the reception of a signal the relay $R^{15}$ is not affected, its tongue will remain against the contact $r^{15}$, in which event only those characters corresponding to the combination of segments covered by the segment $1^x$ will be printed. The relays $R^9$ and $R^{14}$ may be used for any desired purpose, such as ringing bells, &c.

Instead of using both contacts of the relay $R^{15}$ the contact $r^{16}$ only may be used, in which case the segment $l^x$ would be dispensed with.

It will be seen from the foregoing description that the circuit-combining device comprises two parts—a circuit-combining part embracing the rings S, S', and $S^2$ and a current-distributing part consisting of the ring $S^3$—that is to say, the circuits are combined in the first-named rings, and the current is distributed to the distributing-relays by the ring $S^3$. The ring $S^3$, in other words, determines to which of the distributing-relays the current in the circuits combined by the other rings shall pass.

Figure 14:
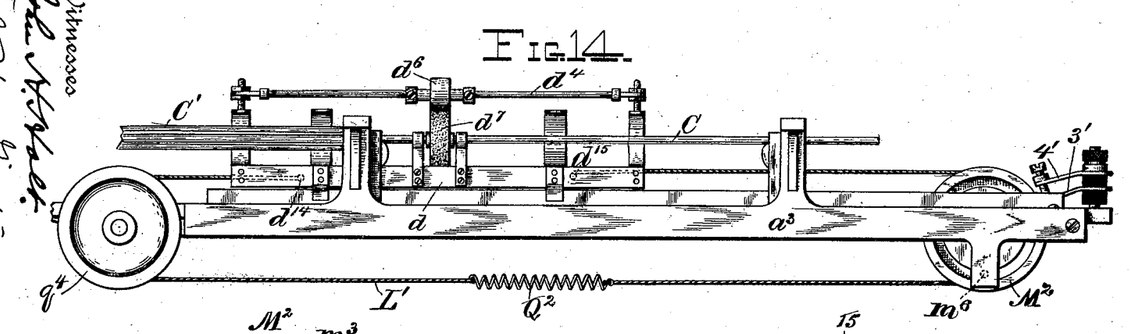
Fig. 14 represents a portion of the printer in side elevation, showing a somewhat different method of returning the carriage to the beginning of a new line.
Figure 15:
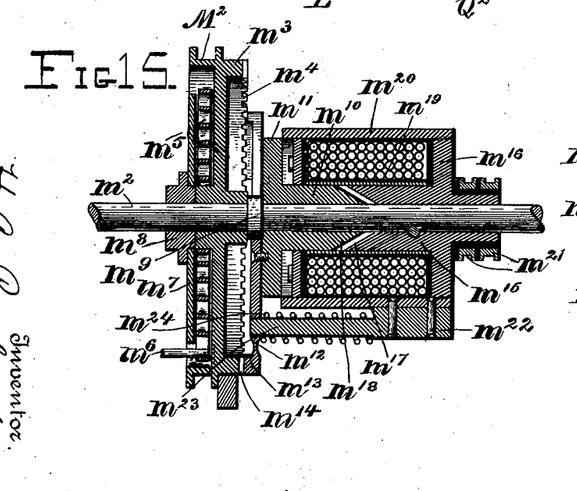
Fig. 15 represents a section taken along the line 15 15, Fig. 16.
Figure 16:
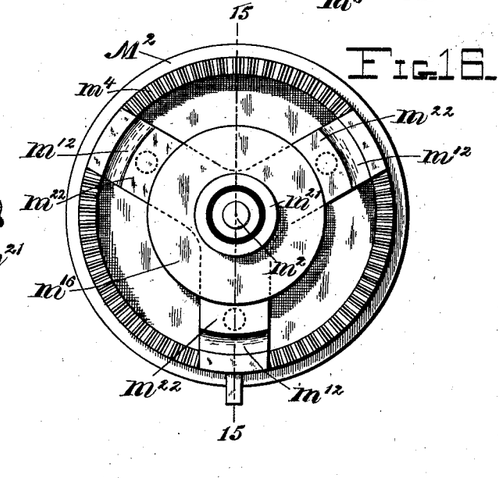
Fig. 16 represents an end elevation of the magnetic clutch mechanism for returning the carriage.

Instead of imparting forward motion to the carriage by a falling weight attached to the pulley $q'$, as described, and returning it to the beginning of a new line by the magnetic and gear mechanisms shown and described I may employ the means for accomplishing these results as shown in Figs. 14, 15, and 16. In this instance the pulley $q$ is replaced by a pulley $q^4$. The cord or chain L' is secured to the carriage, as at $d^{14}$, passes around the pulley $q^4$, then passes once and a half around the pulley $M^2$, and is then connected to the carriage, as at $d^{15}$, a spring $Q^2$ being inserted in its length, as shown. The pulley or wheel $M^2$ is mounted loosely upon the shaft $m^2$ and is provided upon one face with the annular flange $m^3$, in which are cut the gear-teeth $m^4$. A spiral spring $m^5$ is secured at its inner end to the boss of the wheel $M^2$ and at its outer end to a fixed pin $m^6$ on the frame of the machine. The spring $m^5$ is held in place by a disk $m^7$. Lateral movement of the wheel $M^2$ is prevented by the collars $m^8$ and $m^9$, between which the boss of the wheel is mounted. Loosely mounted on the shaft $m^2$ on the other side of the collar $m^9$ from the wheel $M^2$ is a soft-iron collar $m^{10}$, having at one end an annular flange $m^{11}$, to which is secured a three-arm spider $m^{12}$. At one end of each of the arms of this spider is formed a lug $m^{13}$, provided with gear-teeth $m^{14}$, which are adapted to mesh with the teeth $m^4$ of the wheel. A soft-iron collar $m^{15}$, having at one end an annular flange $m^{16}$, is keyed to the shaft and is hollowed out at its inner end, as at $m^{17}$, to receive the conical end $m^{18}$ of the sleeve $m^{10}$. A bobbin wound with the wires $m^{19}$ fits fast over the sleeve $m^{15}$ and extends over the sleeve $m^{10}$, the latter being adapted to form a sliding core for the bobbin. A soft-iron shell or sleeve $m^{20}$ is screw-threaded upon the flange $m^{16}$ and incloses the bobbin, as shown. The current is transmitted to the bobbin through the collector-rings $m^{21}$. Three lugs $m^{22}$ are secured fast to the sleeve $m^{20}$ and each is provided with an arm or rod $m^{23}$, each of which rods passes through an aperture in a corresponding arm of the spider $m^{12}$. A coil-spring $m^{24}$, carried upon each of the rods $m^{23}$, keeps the teeth of the spider-arms normally in engagement with the teeth $m^4$ of the wheel. When the characters are being printed, the carriage is moved forward step by step by the ratchet-and-pawl device herein shown and described or by any other similar suitable device. When this is taking place, the teeth on the spider-arms will be held under the tension of the springs $m^{24}$ in engagement with the teeth of the wheel $M^2$, which will cause the wheel to wind up the spring $m^5$. When, however, it is desired to start the carriage back in the opposite direction, the circuit is completed through the coil $m^{19}$, which will suck the core $m^{10}$ into the bobbin and disengage the teeth of the spider and wheel. When this takes place, the wheel, acting under the influence of the spring $m^5$, will start revolving in the opposite direction, carrying the carriage in the same direction. The circuit through the coil $m^{19}$ may be made at will or automatically when the end of a line is reached, all substantially as described for the form of carriage-returning mechanism hereinbefore described.

Having thus described my invention, it is obvious that the same is capable of many changes which may be made without departing from the spirit thereof; but

What I claim, and desire to secure by Letters Patent of the United States, is—

1. In a printing-machine, the combination with a paper-supporting carriage, of means carried thereby for engaging the paper at a point approximately midway between its sides, a depending guide-frame also carried by said carriage and paper-guides carried by said frame below said carriage and engaging the edges of said paper, substantially as described.

2. In a printing-machine, the combination with a paper-supporting carriage, of paper-feed rollers engaging the paper at a point approximately midway between its sides, a depending guide-frame also carried by said carriage and adjustable paper-guides carried by said frame below said carriage and engaging the edges of said paper, substantially as described.

3. In a printing-machine, the combination with a paper-feed roller, of a shaft carrying said roller and capable of lateral and rotary motion, a carriage attached to said shaft and traveling laterally therewith, a roller carried by said carriage and engaging the said paper-feed roller, the paper being engaged between the said rollers at a point approximately midway between its sides, a depending guide-frame also carried by said carriage and paper-guides carried by said frame below the carriage and engaging the edges of said paper, substantially as described.

4. In a printing-machine, the combination with a carriage consisting of a horizontal bar, uprights secured to said bar, a rod secured at its ends to said uprights, a roller mounted on said rod, and hangers secured to said bar, of a horizontal shaft journaled in the said hangers, a paper-feed roller mounted fast on said shaft and between said hangers, said roller engaging the roller aforesaid, and means for imparting lateral motion to said carriage and rotary motion to said rollers, substantially as described.

5. In a printing-machine, the combination with a carriage consisting of a horizontal bar, uprights secured to said bar, a rod secured at its ends to said uprights, a roller mounted on said rod, and hangers secured to said bar, of a horizontal shaft journaled in the said hangers, a paper-feed roller mounted fast on said shaft and between said hangers, said roller engaging the roller aforesaid, the said rollers engaging the paper at a point approximately midway between its sides, a depending guide-frame also carried by said carriage and paper-guides carried by said frame below said carriage and engaging the edges of said paper, and means for imparting lateral motion to said carriage and rotary motion to said rollers, substantially as described.

6. In a telegraphic printer, the combination with a paper-supporting carriage, of means carried thereby for engaging the paper at a point approximately midway between its sides, a depending guide-frame also carried by said carriage and paper-guides carried by said frame below said carriage and engaging the edges of said paper, a rotating type-wheel located in proximity to said paper and an electrically-operated platen adapted to print the characters on said paper from said type-wheel, substantially as described.

7. In a printing-machine, the combination with a paper-feed roller, of a horizontal shaft carrying said roller, a longitudinally-slotted flanged sleeve in which said shaft slides, a lug carried by said shaft and engaging the slot and flanges of said sleeve, a ratchet secured to said sleeve, a pawl engaging said ratchet, an electromagnet operating said pawl for imparting rotary motion to said sleeve whereby the said feed-roller is caused to rotate, substantially as described.

8. In a printing-machine, the combination with a paper-feed roller, of a horizontal shaft carrying said roller, a printer-carriage supported from said shaft, a roller carried by said carriage and engaging said paper-feed roller, means for imparting rotary motion to the said paper-feed roller, and means for imparting lateral motion to said carriage, substantially as described.

9. In a printing-machine, the combination with a paper-feed roller, of a horizontal shaft carrying said roller, a printer-carriage supported from said shaft, a roller carried by said carriage and engaging said paper-feed roller, means for imparting rotary motion to the said paper-feed roller, and electromagnetically-operated mechanism for imparting lateral step-by-step motion to said carriage, substantially as described.

10. In a printing-machine, the combination with a paper-feed roller, of a horizontal shaft carrying said roller, a printer-carriage supported from said shaft, a roller carried by said carriage and engaging said paper-feed roller, means for imparting rotary motion to the said paper-feed roller, electromagnetically-operated spacing mechanism for imparting a lateral step-by-step motion to said carriage and a releasing mechanism for returning the carriage to its initial position, substantially as described.

11. In a printing-machine, the combination with a paper-supporting carriage, of a shaft and means for imparting rotary motion to said shaft, a wheel, gearing having two degrees of freedom and connecting said wheel with said shaft, and flexible connection between said wheel and said carriage whereby lateral motion is imparted to said carriage by the rotation of said wheel, substantially as described.

12. In a printing-machine, the combination with a paper-supporting carriage, of a shaft, electromagnetically-operated means for imparting rotary motion to said shaft, a wheel, gearing having two degrees of freedom connecting said wheel with said shaft, and flexible connection between said wheel and said carriage, whereby lateral motion is imparted to said carriage by the rotation of said wheel, substantially as described.

13. In a printing-machine, the combination with a paper-supporting carriage, of a wheel, connecting means between said wheel and said carriage, a shaft, gearing having two degrees of freedom and connecting said wheel with said shaft, a ratchet-and-pawl mechanism for imparting rotary motion to said shaft, and an electromagnet for actuating the said ratchet-and-pawl mechanism, whereby lateral motion is imparted to the said carriage by the rotation of said wheel, substantially as described.

14. In a printing-machine, the combination with a paper-supporting carriage, of a wheel, connecting means between said wheel and said carriage, a shaft, gearing having two degrees of freedom and connecting said wheel with said shaft, a ratchet-and-pawl mechanism for imparting rotary motion to the said shaft, an electromagnet for actuating said ratchet-and-pawl mechanism, whereby lateral forward motion is imparted to said carriage, and release and return mechanism for returning the carriage to its initial position, substantially as described.

15. In a printing-machine, the combination with a paper-supporting carriage, of a wheel, connecting means between said wheel and said carriage, a shaft, gearing having two degrees of freedom and connecting said wheel with said shaft, means for imparting a rotary motion to said shaft, whereby lateral travel is imparted to said carriage, and means for automatically returning the said carriage to its initial position when it has reached the end of its travel, substantially as described.

16. In a printing-machine, the combination with a paper-supporting carriage, of a wheel, connecting means between said wheel and said carriage, a shaft upon which said wheel is mounted and with which it rotates, a second shaft and means for imparting rotary motion thereto, releasing-gearing having two degrees of freedom through which the wheel-shaft is connected to the second shaft, an electromagnet for operating said releasing-gearing and a gravity device for returning the said carriage to its initial position, substantially as described.

17. In a printing-machine, the combination with a paper-supporting carriage, of a shaft and means for imparting rotary motion thereto, releasing-gearing having two degrees of freedom and connecting with said shaft, and operative means connecting the said carriage with said gearing, whereby lateral motion is imparted to said carriage, substantially as described.

18. In a printing-machine, the combination with a paper-supporting carriage, of a shaft and means for imparting rotary motion to said shaft, a wheel, releasing-gearing having two degrees of freedom and connecting said wheel with said shaft, connecting means between said wheel and said carriage, whereby lateral motion is imparted to said carriage by the rotation of said wheel, substantially as described.

19. In a printing-machine, the combination with a paper-supporting carriage, of a wheel, connecting means between said wheel and said carriage, a shaft upon which said wheel is mounted and with which it rotates, a plurality of planet-gears secured to the said shaft, an interiorly-toothed ring meshing with said gears, a toothed disk secured to said ring, a central gear meshing with said planet-gears, a shaft secured fast to said central gear and means for imparting rotary motion to said shaft, an electromagnet and armature operated thereby, the said armature engaging the teeth of said toothed disk, a gravity device for imparting reverse motion to said carriage when the said electromagnet withdraws its armature from engagement with said disk, substantially as described.

20. In a printing-machine, the combination with a paper-feed roller, of a horizontal shaft carrying said roller, a sleeve engaging the said shaft and in which the said shaft may slide longitudinally, means for preventing said shaft from rotating independently of said sleeve, means for imparting rotary motion to said sleeve and through said shaft to said paper-feed roller, a carriage suspended from said shaft and having a roller adapted to engage the said paper-feed roller and means for imparting lateral motion to said carriage, substantially as described.

21. In a printing-machine, the combination with a paper-feed roller, of a horizontal shaft carrying said roller, a sleeve engaging the said shaft and in which the said shaft may slide longitudinally, means for preventing the said shaft from rotating independently of said sleeve, means for imparting rotary motion to said sleeve and through said shaft to said paper-feed roller, a carriage suspended from said shaft, a roller carried by said carriage and adapted to engage the said paper-feed roller and means for imparting lateral forward motion to said carriage, and release and return mechanism whereby the said carriage is returned to its initial position, substantially as described.

22. In a printing-machine, the combination with a paper-feed roller, of a horizontal shaft carrying said roller, a sleeve engaging the said shaft and in which the said shaft may slide longitudinally, means for preventing the said shaft from rotating independently of said sleeve, electromagnetically-operated means for imparting rotary motion to said sleeve and through said shaft to said paper-feed roller, a carriage suspended from said shaft, a roller carried by said carriage and adapted to engage the said paper-feed roller, electromagnetically-operated means for imparting forward lateral motion to said carriage, and an electrically-operated release and return mechanism by which the said carriage is returned to its initial position, substantially as described.

23. In a printing-machine, the combination with a paper-feed roller, of a horizontal shaft carrying said roller, a sleeve engaging the said shaft and in which the shaft may slide longitudinally, means for preventing the said shaft from rotating independently of said sleeve, and electrically-operated ratchet-and-pawl mechanism for imparting rotary motion to said sleeve and through said shaft to said paper-feed roller, a carriage suspended from said shaft, a roller carried by said carriage and adapted to engage the said paper-feed roller, an electrically-operated ratchet-and-pawl mechanism for imparting forward lateral motion to said carriage, and an electrically-operated release and gravity-operated return mechanism by which the said carriage is returned to its initial position, substantially as described.

24. In a printing-machine, the combination with a paper-supporting carriage, of electrically-operated spacing mechanism for imparting a forward lateral movement to said carriage, an electrically-operated line mechanism, whereby the paper is fed from line to line, an electrically-operated release and return mechanism whereby the carriage is returned to its initial position, and a rotating arm operated by said spacing mechanism and completing the electric circuit through said return mechanism when the carriage has reached the end of its travel in a forward direction and completing a circuit through the spacing mechanism when the carriage returns to its initial position, substantially as described.

25. In a printing-machine, the combination with a paper-supporting carriage, of a wheel, flexible connection between said wheel and said carriage, a shaft upon which said wheel is mounted and with which it rotates, spacing mechanism for imparting a rotary motion to said shaft, electromagnets operating the said spacing mechanism, release and return mechanism for returning said carriage to its original position, electromagnets operating said releasing mechanism, and an arm carried upon the shaft with the aforesaid wheel and completing the circuit through said releasing-magnet when the carriage has reached the end of its forward travel and completing a circuit through said spacer-magnet when the carriage has returned to its original position, substantially as described.

26. In a telegraphic printer having the printing, paper-feed, and paper release and return mechanisms, substantially as described, in combination with a circuit-combining and a current-distributing device, adapted to combine a plurality of local circuits for each combination of signals received and to distribute the current to the electromagnetic parts of the printer during each cycle of operations accompanying the printing of a character, and a plurality of selecting-relays connected to said circuit-combining device and closing circuits therethrough in combinations for each signal received, substantially as described.

27. In a telegraphic printer, the combination with a type-wheel and an electromagnetically-operated platen, of the electromagnetically-operated paper-feed, spacing and release mechanisms, a circuit-combining device consisting of a plurality of sets of conducting-segments having contact-makers which pass over said segments, a source of electric current connected to the electromagnets of said printing, spacing, paper-feed and release mechanisms, a plurality of electromagnetic devices each having one contact connected in the circuit with the printing, spacing, paper-feed and return magnets respectively, one magnet-coil of each of said magnetic devices being connected to a set of segments of the said circuit-combining device, the flow of the current which actuates the magnets of the said printing, paper-feed, spacing and release mechanisms being governed by prearranged combinations of segments passing simultaneously in contact with said contact-makers, substantially as described.

28. In a telegraphic printer having the electromagnetically-operated printing, paper-feed, spacing and release mechanisms, substantially as described, in combination with a circuit-combining device, consisting of a plurality of sets of conducting-segments arranged in combinations and having contact-makers passing over said segments; a source of electric current connected to the electromagnets of the said printing, paper-feed, spacing and release mechanisms, the flow of the said current to the said mechanisms being governed by prearranged combinations of said segments passing simultaneously in contact with said contact-makers, substantially as described.

29. In a telegraphic printer, the combination with a continuously-rotating type-wheel, of a circuit-combining device consisting of a plurality of sets of conducting-segments arranged in as many combinations as there are characters or divisions on the type-wheel, electrically-connected contact-makers passing together over the said segments, a source of current connected in the circuit with said contact-makers but being allowed to flow therethrough only at such times as prearranged combinations of said segments come beneath said contacts, substantially as described.

30. In a telegraphic printing-machine, the combination with a printing-magnet having an armature and forward contact, a polarized relay having one of its contacts connected in series with the printing-magnet coil, and one of its magnet-coils in series with said forward contact of the printing mechanism, a paper-feed magnet provided with an armature and forward contact, a second polarized relay having one contact in series with said paper-feed-magnet coil, and one of its magnet-coils in series with said forward contact of said paper-feed magnet, a spacing-magnet provided with an armature and forward contact, a third polarized relay with one of its contacts connected in series with the spacing-magnet coil and having one of its magnet-coils connected to the forward contact of said spacing-magnet; a carriage-release magnet and a polarized relay having one of its contacts connected in series with said carriage-release-magnet coil and means for operating the said polarized relays whereby the printing-magnet, spacer, release and liner magnets are each operated at the proper time, substantially as described.

31. In a telegraphic printing-machine, the combination with a printing-magnet having an armature and forward contact, a polarized relay having one of its contacts connected in series with the printing-magnet coil, and one of its magnet-coils in series with said forward contact of the printing mechanism, a paper-feed magnet provided with an armature and forward contact, a second polarized relay having one contact in series with said paper-feed-magnet coil and one of its magnet-coils in series with said forward contact of said paper-feed magnet, a spacing-magnet provided with an armature and forward contact, a third polarized relay with one of its contacts connected in series with the spacing-magnet coil and having one of its magnet-coils connected to the forward contacts of said spacing-magnet; a carriage-release magnet and a polarized relay having one of its contacts connected in series with said carriage-release-magnet coil and a circuit-combining device connected to those coils of said polarized relays that are not connected to the aforesaid forward contacts, the said device actuating said relays for each combination of signals received, substantially as described.

32. In a telegraphic printer, the combination with a plurality of selecting-relays, of a circuit-combining device consisting of a plurality of groups of conducting-segments, the said selecting-relays each having one contact connected to a corresponding set of segments of the said combining device, contact-makers passing over and in contact with said segments, the said relays closing the circuits from one group of segments to another in combinations for each signal received and a printing, paper-feed, spacing and release mechanism operated at such times as the several contact-makers rest simultaneously on the segments of the combining devices which have their circuits completed by said relays, substantially as described.

33. A telegraphic printing-machine, having the printer, liner, spacer and carriage-return magnets substantially as described, in combination with a plurality of conductors, brushes moving over and in contact with said conductors, said conductors being divided into groups, current-distributing apparatus connected to said conductors and to said magnets whereby currents will be distributed to the several magnetic parts of said printer in order and only at such times as a predetermined combination of said conductors pass beneath said brushes, substantially as described.

34. In a page-printer, the combination with a plurality of selecting-relays, of a circuit-combining device connected to said relays, current-distributing relays connected to said circuit-combining device and to the electromagnetic parts of said printer, said distributing-relays distributing currents to said electromagnetic parts only at such times as are determined by said circuit-combining device, substantially as described.

35. In a page-printer, the combination with a series of selecting-relays, a circuit-combining device connected to said relays, a plurality of current-distributing relays connected to said circuit-combining device, and the printer, liner, spacer, and carriage-return magnets of said printer connected to said distributing-relays and having electric currents distributed to them in order at such times as the said circuit-combining device combines a plurality of circuits, substantially as described.

36. A page-printing machine, having the continuously-moving type-wheel, and the printer, liner, spacer and carriage-return magnets substantially as described, in combination with a plurality of conductors, brushes moving in synchronism with said type-wheel over and in contact with said conductors, said conductors being divided into groups, current-distributing apparatus connected to said conductors and to said magnets whereby currents will be distributed to the several magnetic parts of said printer in order and only at such times as a predetermined combination of said conductors pass beneath said brushes, substantially as described.

37. A printing-machine, having a movable paper-supporting carriage, in combination with a type-wheel, an electromagnetic printing device, a distributing-relay controlling said device, a circuit-combining device connected to said distributing-relay, and selecting-relays connected to said circuit-combining device and acting therewith to close circuits through said distributing-relay in combinations for each character.

38. A printing-machine, having a movable paper-supporting carriage, in combination with a type-wheel, an electromagnetically-operated printing-hammer, a circuit-combining device, a current-distributing relay operated through said circuit-combining device and completing the circuit through the coils of said printing-hammer magnet for each character to be printed, and means for automatically breaking said circuit directly after the printing of a character.

39. A printing-machine, having a movable paper-supporting carriage, in combination with a type-wheel, a printing-hammer, a printing-hammer magnet, a distributing-relay connected in circuit with said magnet, means for operating said relay whereby the printing-hammer is operated, and means for preventing any further action of said relay until the printing-hammer has acted.

40. A printing-machine having a movable paper-supporting carriage, in combination with a type-wheel, an electromagnetic printing device, spacing, lining and carriage-return mechanisms, distributing-relays controlling said device and mechanisms, and a circuit-combining device through which said relays are actuated, substantially as described.

41. A circuit-combining device having a combining part and a distributing part, selecting-relays connected to the combining part, distributing-relays connected to the distributing part and a printing-machine operated by said distributing-relays, substantially as described.

42. A circuit-combining device having a combining part and a distributing part, selecting-relays connected to the combining part, distributing-relays connected to the distributing part, and an electromagnetically-operated printing-machine having its circuits controlled by said distributing-relays, substantially as described.

In testimony whereof I affix my signature in presence of two witnesses.

HENRY A. ROWLAND.

Witnesses:
JOHN H. HOLT,
J. STEPHEN GIUSTA.